(12) United States Patent
Satorius

(10) Patent No.: US 6,580,841 B2
(45) Date of Patent: Jun. 17, 2003

(54) CHIRPED FIBER ACOUSTO-OPTIC BANDPASS FILTER

(75) Inventor: Duane Anthony Satorius, Fulton, MD (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 0 days.

(21) Appl. No.: 09/683,023

(22) Filed: Nov. 8, 2001

(65) Prior Publication Data

US 2003/0086634 A1 May 8, 2003

(51) Int. Cl.[7] .................................................. G02B 6/26
(52) U.S. Cl. ............................... 385/7; 385/27; 385/28
(58) Field of Search .............................. 385/7, 27, 28, 385/39, 43

(56) References Cited

U.S. PATENT DOCUMENTS 6,151,427 A * 11/2000 Satorius .......................... 385/7
2001/0033710 A1 * 10/2001 Kim et al. ..................... 385/28

* cited by examiner

Primary Examiner—Rodney Bovernick
Assistant Examiner—Juliana K. Kang
(74) Attorney, Agent, or Firm—Stephen M. Bloor

(57) ABSTRACT

A device whereby one or more bands of optical wavelengths may be selected for further transmission. All light within the optical bandwidth of operation is first coupled from the core mode of an optical fiber to a specific cladding mode by a chirped broadband cladding mode coupler. These cladding mode lightwaves then enter a narrow-band core mode coupler whereby selected optical bands of wavelengths are re-coupled back into the core of the optical fiber. The chirped broadband cladding mode coupler is isolated from the narrow-band core mode coupler by an acoustic absorber to limit the acoustic interaction between them.

14 Claims, 6 Drawing Sheets

CHIRPED FIBER ACOUSTO-OPTIC BANDPASS FILTER

BACKGROUND OF INVENTION

1. Field of the Invention

This invention relates generally to telecommunication systems and assemblies, and more particularly to a chirped fiber acousto-optic bandpass filter.

2. Description of the Related Art

An important function in the telecommunication industry is signal switching. The switching can be performed either electronically or optically. In past years, this switching was accomplished through electronic means. However, with the increasing demand for lower cost, higher switching speeds, lower power consumption, and lower optical losses, optical switching is becoming more commonplace. There are two types of optical switches currently used, wavelength insensitive optical switches and wavelength sensitive optical switches. The wavelength insensitive optical switches are typically broadband fiber-to-fiber switches used to redirect all the traffic from one optical fiber to another. Because the switching process is either thermo, electro-optic, or mechanical, the switching speed is slow but satisfactory. However these switches do not satisfy the requirements for low cost, high reliability, and low optical insertion loss.

The wavelength sensitive optical switches are needed for wavelength division multiplexed (WDM) signals because the wavelength separation between channels is small. A narrow optical band of traffic carried by a specific wavelength of a multi-wavelength signal may need to be separated from the rest of the traffic. A wavelength-sensitive optical switch can perform this function optically at considerable cost savings. Existing wavelength sensitive optical switches are usually bulky, have high power consumption, and high optical insertion losses. For instance, in a previous patent by this inventor entitled Tunable Optic Fiber Bandpass Filter Using Flexural Acoustic Waves, U.S. Pat. No. 6,151,427, an acousto-optic bandpass filter was described, however that invention uses a core block that introduces significant optical insertion losses, added complexity, and is costly to manufacture. The present invention does not require a core block component, thereby negating these problems and simplifying the architecture. Other acousto-optic filters include "Acousto-optic Filter," U.S. Pat. No. 6,233,379 by Kim et al, which is hereby incorporated by reference. The filter described performs the function of a band-stop filter and can select a limited number of optical bands (channels) simultaneously but does so at the cost of increased power consumption for each band selected to the limit of the acousto-optic generator. The current invention eliminates all the optical bands (channels) simultaneously and can then select one or more channels to pass through the filter, thus performing a bandpass operation.

SUMMARY OF INVENTION

In consideration of the problems detailed above and the limitations enumerated in the partial solutions thereto, an object of the present invention is to provide an improved chirped fiber acousto-optic bandpass filter that does not require a core-block and uses less electrical power.

Another object of the present invention is to provide a chirped fiber acousto-optic bandpass filter with multiple acoustic signals that have individual controllable strengths and frequencies.

Yet another object of the present invention is to provide a broadband cladding mode coupler to efficiently couple all the optical traffic from a fiber core mode to a fiber cladding mode for later selection of individual optical channels.

Yet a further object of the present invention is to provide an all-fiber chirped acousto-optic bandpass filter that includes an optical fiber with a core and a cladding where the strength or the magnitude of an optical signal coupled from the cladding to the core is changed by varying the amplitude of electrical sinusoidal frequency applied to an acoustic wave generator.

In order to attain the objectives described above, according to an aspect of the present invention, there is provided a chirped fiber acousto-optic bandpass filter whereby one or more bands of optical wavelengths may be selected for further transmission. In this device, all light within the optical bandwidth of operation is first coupled from the core mode of a optical fiber to a specific cladding mode within a first acousto-optic interaction region, a chirped broadband cladding mode coupler, where a selected RF frequency of a flexure wave, induced by a first acoustic wave amplifier, acting on a region of the optical fiber that has been chirped, couples all light within the optical bandwidth of operation from the core mode of the optical fiber to a specific cladding mode. These cladding mode lightwaves then enter a second acousto-optic interaction region, a narrow-band core mode coupler, where selected frequencies of flexure waves, induced by a second acoustic wave amplifier, re-couple selected bands of wavelengths back into the core mode. The second acousto-optic interaction region is isolated from the first acousto-optic interaction region by an acoustic absorber to limit acoustic interaction between the acousto-optic interaction regions.

The aforementioned features, objects, and advantages of this method over the prior art will become apparent to those skilled in the art from the following detailed description and accompanying drawings.

BRIEF DESCRIPTION OF DRAWINGS

My invention can best be understood when reading the following specification with reference to the accompanying drawings, which are incorporated in and form a part of the specification, illustrate alternate embodiments of the present invention, and together with the description, serve to explain the principles of the invention. In the drawings.

DETAILED DESCRIPTION

Figure 1:
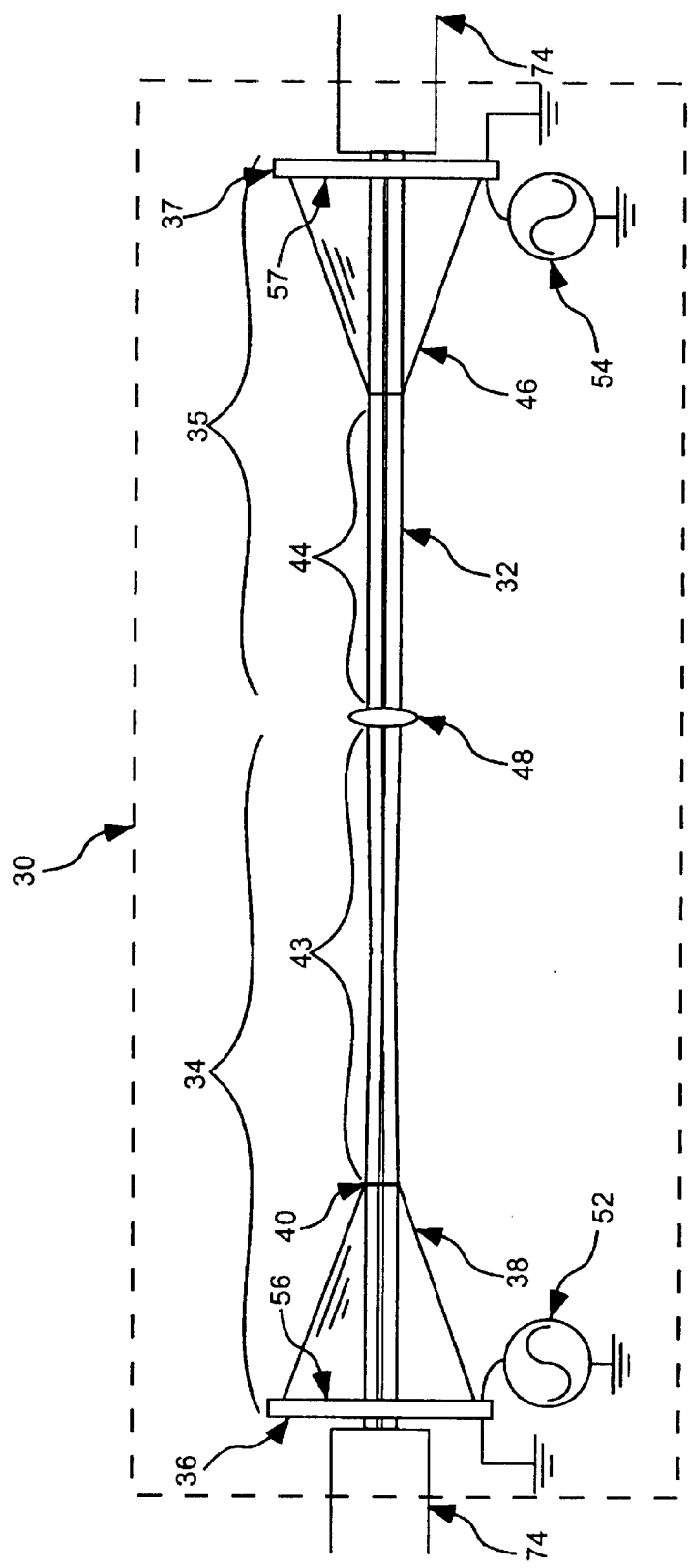
FIG. 1 is a schematic diagram showing one embodiment of the chirped fiber acousto-optic bandpass filter that contains the chirped broadband cladding mode coupler, the acoustic absorber, and the narrow-band core mode coupler.

In one embodiment of a chirped fiber acousto-optic bandpass filter (herein bandpass filter) 30, the present invention, as shown in FIG. 1, one or more optical wavelength bands may be selected for further transmission. In this device, all lightwaves within the optical bandwidth of operation are first coupled, in a chirped broadband cladding mode coupler 34, from the core mode of a non-birefringent single-mode optical fiber (herein fiber or optical fiber) 32 to a specific cladding mode using a fiber 32 whose diameter is altered in a linear (chirped) fashion within the first acousto-optic interaction region 43. In the chirped broadband cladding mode coupler 34, a first acoustic-wave generator 36 produces a mechanical vibration at a fixed frequency provided by the first frequency source 52. The mechanical vibration creates acoustic waves that travel from the base 56 to the tip 40 of the first acoustic wave amplifier 38. The acoustic waves are coupled to the optical fiber 32 at the tip 40 of the first acoustic wave amplifier 38. The acoustic waves traverse along the first acousto-optic interaction region 43 of the optical fiber 32 as a traveling flexure wave significantly coupling the lightwaves from the core mode to a cladding mode within the optical fiber 32. These cladding mode lightwaves then enter a narrow-band core mode coupler 35 which has a second acousto-optic interaction region 44 where selected flexure wave frequencies, induced by a second acoustic wave amplifier 46, re-couple selected narrow bands of optical wavelengths back into the core mode of the optical fiber 32. The second acousto-optic interaction region 44 of the narrow-band core mode coupler 35 is isolated from the first acousto-optic interaction region 43 of the chirped broadband cladding mode coupler 34 by an acoustic absorber 48 to limit acoustic interaction. The core mode coupling of a narrow band of optical wavelengths within the narrow-band core mode coupler 35 may be optically tuned by varying the electrical sinusoidal frequency of the second frequency source 54 that is electrically connected to the second acoustic wave generator 37, which in turn creates a mechanical vibration frequency. The acoustic wave generator 37 is attached to the base 57 of the second acoustic wave amplifier 46. The generated acoustic waves traverse through the second acoustic wave amplifier 46 and are coupled to the fiber 32.

The coupling within the chirped broadband cladding mode coupler 34 is accomplished by generating an electrical sinusoidal frequency using a first frequency source 52 that is electrically attached to the first acoustic wave generator 36. The electrical sinusoidal signal causes a mechanical vibration of the first acoustic wave generator 36 that launches acoustic waves from the base 56 to the tip 40 of the first acoustic wave amplifier 38. The acoustic waves are then coupled to the fiber 32 and propagate as traveling flexure waves within the first acousto-optic interaction region 43 and terminate at the acoustic absorber 48. The traveling flexure waves create a microbend structure in the fiber 32 within the first interaction region 43. The microbend structure induces an asymmetric refractive index change in the fiber 32, and thereby couples lightwaves from a symmetric core mode to an asymmetric. cladding mode. For efficient mode coupling, the period of the microbending, or the acoustic wavelength, should match the beat length defined by the coupled modes. The beat length is defined by the optical wavelength divided by the effective refractive index difference between the two modes. Because of the chirped diameter of the fiber 32 within the first acousto-optic interaction region 43, the acoustic wavelength and thus the optical wavelength band being coupled to the cladding will change as the lightwaves propagate through the first acousto-optic interaction region 43, causing a broadband of optical lightwaves to be coupled from the core mode to the cladding mode.

At least one first acoustic wave generator 36 is coupled to the base 56 of the first acoustic wave amplifier 38 which mechanically vibrates, typically at a frequency in the range of 1–40 MHz. The first acoustic wave generator 36 is preferably deployed as a shear mode transducer. The first acoustic wave generator 36 can be made at least partially of a piezoelectric material whose physical shape is changed in response to an applied electric sinusoidal voltage induced by the first frequency source 52. Suitable piezoelectric materials include but are not limited to quartz, lithium niobate, zinc monoxide, and PZT, a composite of lead, zinconate, and titanate.

The narrow-band core mode coupler 35 is used to select individual optical wavelength bands for transmission through the bandpass filter 30. The second acoustic wave generator 37 may produce acoustic waves having various frequencies with individual controllable amplitudes to couple cladding modes of a particular optical wavelength back into the core 70 of the fiber 32. Each of the acoustic waves may provide a coupling between the cladding mode and the core mode within the second acousto-optic interaction region 44. Thus, selected optical wavelengths of the signal may be converted from the cladding mode to the core mode by choosing the appropriate electrical sinusoidal frequencies for the signal applied to the acoustic wave generator 37.

As the lightwaves propagate as a cladding mode along the fiber 32 and past the acoustic absorber 48, a desired band of optical wavelengths may be converted back to the core mode provided the phase-matching condition is satisfied according to: $L_b = \Lambda_a = 2\pi/(\beta_{co}(\lambda) - \beta_{cl}(\lambda))$, where $\Lambda_a$ represents the acoustic wavelength of the traveling flexure acoustic waves, $L_b$ represents the beat length, and $\beta_{co}(\lambda)$ and $\beta_{cl}(\lambda)$ are optical wavelength dependent propagation constants of the core mode and the cladding mode, respectively. When the acoustic wavelength $\Lambda_a$ is equal to the beat length $L_b$ defined by the two modes, the phase-matching condition is satisfied and conversion between modes occurs. The remaining cladding mode lightwaves that are not converted to the core mode get absorbed in the buffer material 74 of the fiber upon exiting the bandpass filter 30 or may be absorbed by the bonding agent 50 of the second acoustic wave amplifier 46. The desired optical wavelength band may be tuned by adjusting the electrical sinusoidal frequency of the second frequency source 54 and the coupling efficiency may be tuned by adjusting the amplitude of the electrical sinusoidal frequency applied to the second acoustic wave generator 37.

Accordingly, if the frequency of the electrical sinusoidal signal applied to the second acoustic wave generator 37 varies, the acoustic wavelength generated within the second acousto-optic interaction region 44 also varies, which results in the passage of a different band of lightwaves by the bandpass filter 30. In addition, since the magnitude of the optical signal that is transmitted is dependent of the amplitude of the traveling flexure acoustic wave, the optical signal strength can be adjusted by varying the amplitude of the electrical sinusoidal signal that is applied to the second acoustic wave generator 37.

Figure 2:
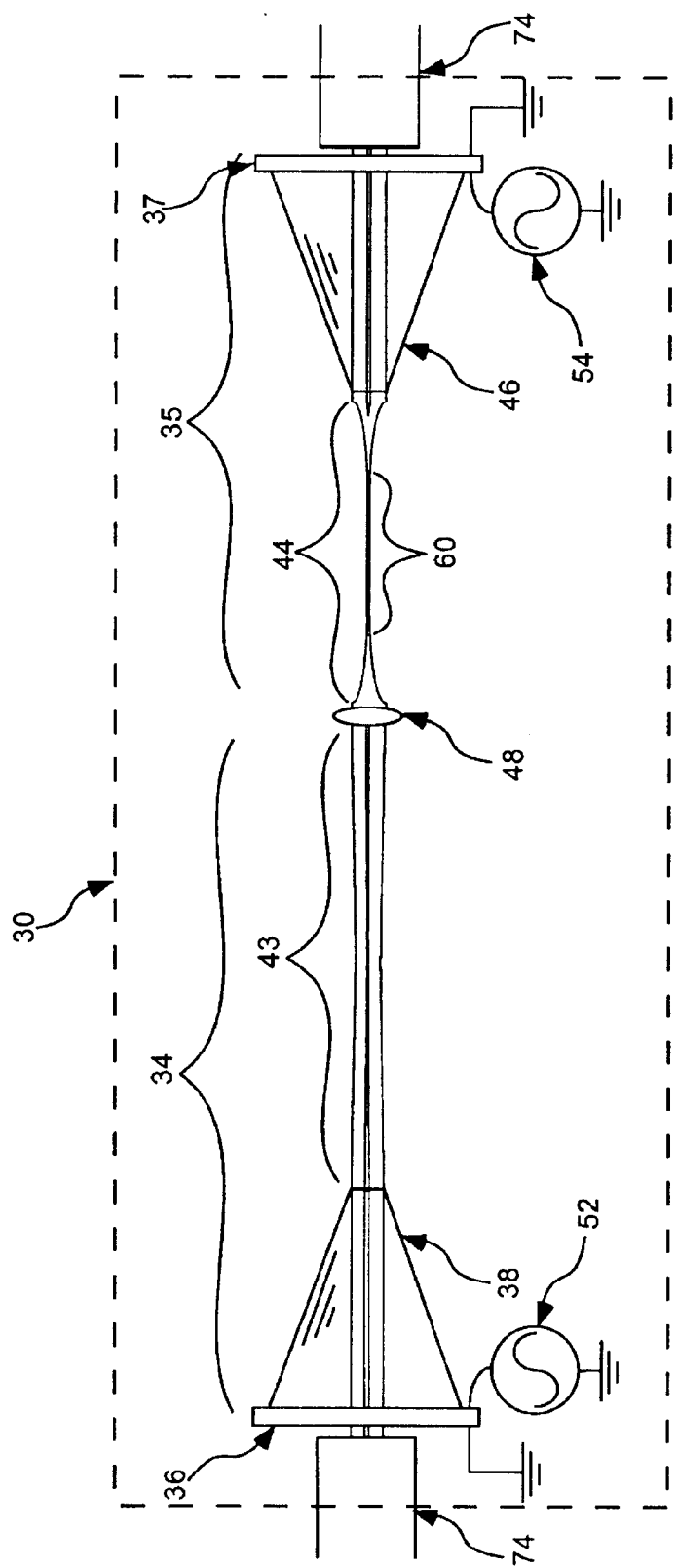
FIG. 2 is a schematic diagram of another embodiment of the chirped fiber acousto-optic bandpass filter that contains the chirped broadband cladding mode coupler and the narrow-band core mode coupler with a tapered interaction region.

In another embodiment of the bandpass filter 30, as illustrated in FIG. 2, the fiber 32 within the second acousto-optic interaction region 44 of the narrow-band core mode coupler 35 is tapered. This uniformly tapered optical fiber 60 provides enhanced conversion efficiency and allows for a shorter second acousto-optic interaction region 44. As shown, the uniformly tapered optical fiber 60 has a section where the diameter of the fiber 32 is uniformly narrowed for some length. This uniformly tapered optical fiber 60 may be created by a variety of methods including, but not limited to, a pulling process using a traveling torch as described in Acousto-optic Filter, U.S. Pat. No. 6,233,379, by Kim et al. The tapering process causes the core 70 of the optical fiber 32 to be eliminated within the uniformly tapered optical fiber 60. The optical lightwaves within this uniformly tapered optical fiber 60 then propagate as cladding modes within the optical fiber 32. The propagation constants of supported optical modes can be greatly changed by a diameter change of the optical fiber 32 in the second acousto-optic interaction region 44. Additionally, the internal stress distribution is modified by stress annealing induced by the flame. Because the diameter of the fiber 32 within the second acousto-optic interaction region 44 will be significantly reduced, higher electrical sinusoidal frequencies will be needed to generate a shorter acoustic wavelength, $\Lambda_a$. The shorter acoustic wavelength is necessary to convert the higher order cladding mode into the lower order cladding mode at the desired optical wavelength. These lower order cladding mode lightwaves propagate into core modes beyond the uniformly tapered optical fiber 60 as the fiber 32 returns to its standard diameter. A more detailed discussion of the theory and experimental results are included in a paper entitled Narrow-Band Acousto-Optic Tunable Filter Fabricated From A Highly Uniform Tapered Optical Fiber by Dimmick, et al. and is hereby included as a reference. The resultant effect of using a uniformly tapered optical fiber 60 within the second acousto-optic interaction region 44 is an improved cladding mode to core mode conversion efficiency.

Figure 3:
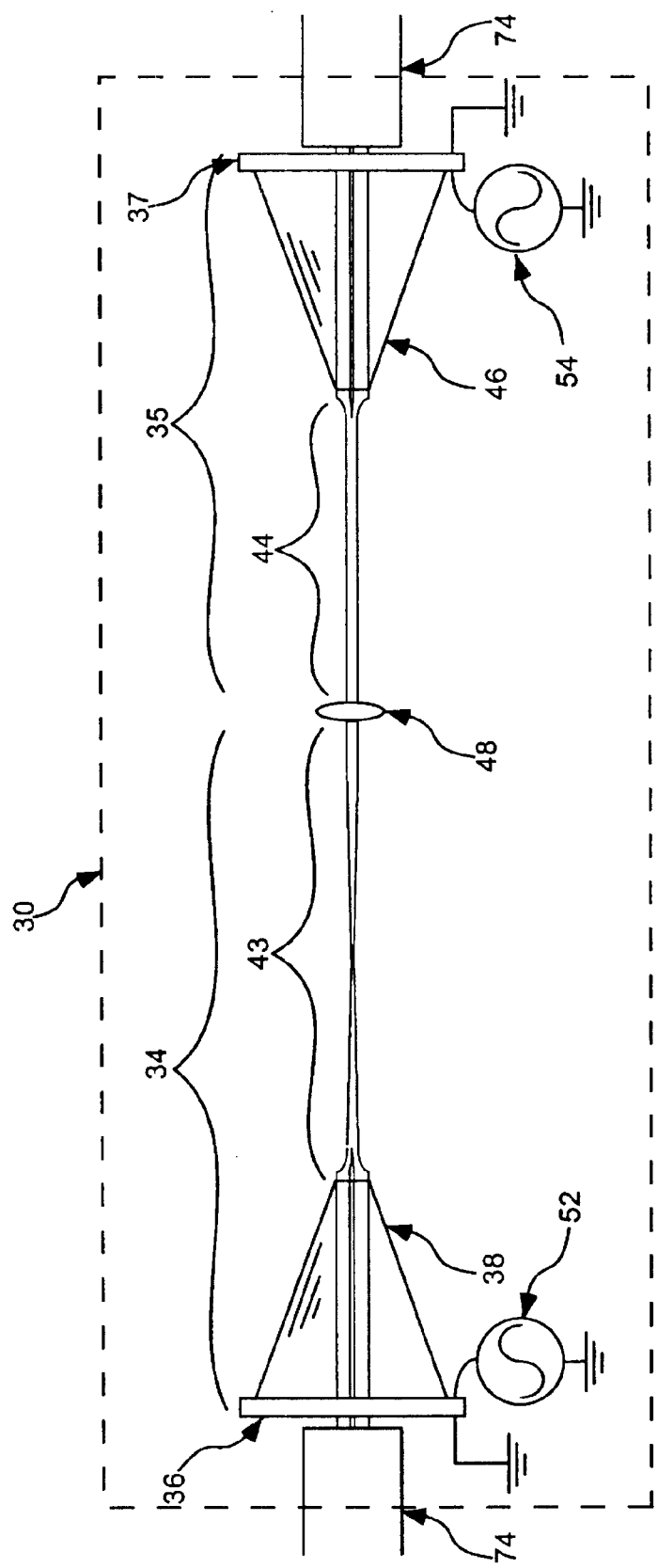
FIG. 3 is a schematic diagram of yet another embodiment of the chirped fiber acousto-optic bandpass filter that contains the chirped broadband cladding mode coupler with a tapered interaction region, the narrow-band core mode coupler, also with a tapered interaction region.

In yet another embodiment of the bandpass filter 30, the fiber 32 in the first acousto-optic interaction region 43 of the chirped broadband cladding mode coupler 34 is tapered and chirped as illustrated in FIG. 3. This tapering provides enhanced conversion efficiency and allows for a shorter length of the first acousto-optic interaction region 43. In addition, the tapering of the fiber 32 maybe extended into the narrow-band core mode coupler 35 and the second acousto-optic interaction region 44, providing the advantages described above.

Figure 4:
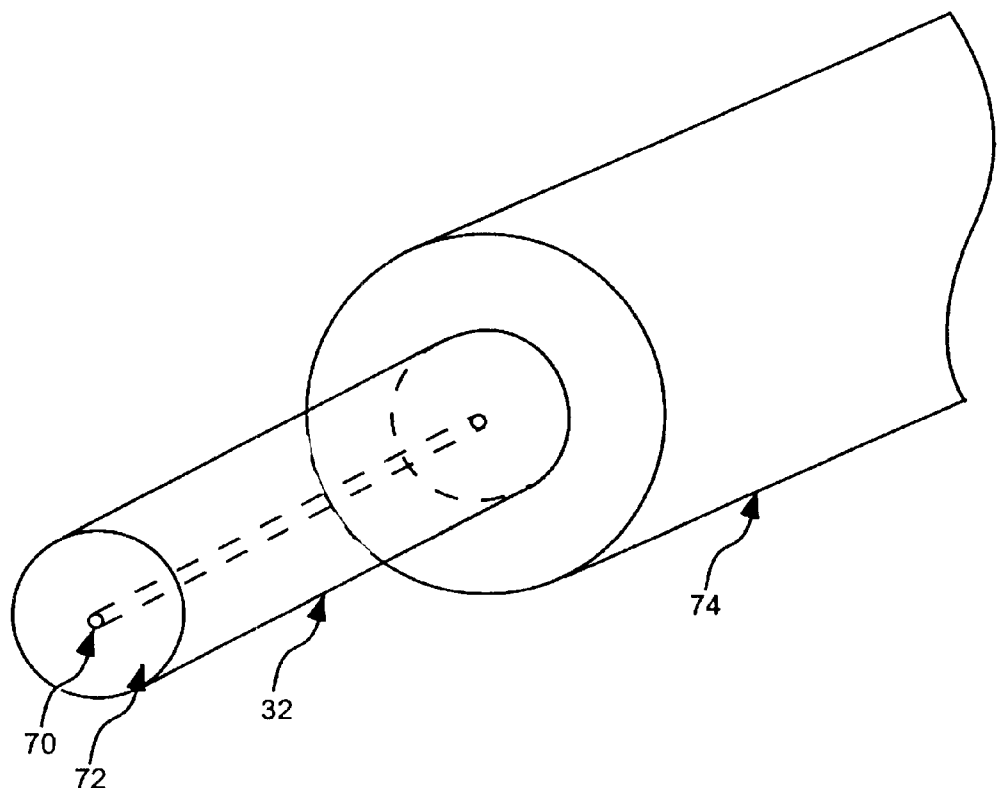
FIG. 4 is a cross-sectional view of the optical fiber.

The fiber 32 has a core 70 and a cladding 72 surrounding the core in a concentric fashion as illustrated in FIG. 4. Surrounding the cladding 72 is a buffer material 74 that provides strength and protection to the optical fiber 32. In all embodiments herein, the buffer material is removed from the optical fiber 32 throughout the length of the chirped broadband cladding mode coupler 34 and narrow-band core mode coupler 35. The buffer material 74 remains present prior to the chirped broadband cladding mode coupler 34 and after the narrow-band core mode coupler 35 to absorb the acoustic energy created by the first 38 and second 46 acoustic wave amplifiers thereby limiting the length of the first 43 and second 44 acousto-optic interaction regions respectively. Additionally, the buffer material following the narrow-band core mode coupler 35 rapidly attenuates the unselected cladding mode lightwaves.

The optical fiber 32 can support the propagation of multiple cladding modes and a single core mode over a nominal wavelength range. In an embodiment of the present invention, the optical fiber 32 is tensioned sufficiently to keep the fiber 32 straight. Keeping the optical fiber 32 straight reduces the loss of cladding mode lightwaves. Although multiple electrical sinusoidal frequencies may be applied to the second acoustic wave generator 37 to select multiple bandwidths, the difference between the electrical sinusoidal frequencies should normally not be less than 50 KHz. Electrical sinusoidal frequencies applied to the second acoustic wave generator 37 and separated by less than 50 KHz cause amplitude modulation of the optical signal passing through the bandpass filter 30. A more detailed explanation of the amplitude modulation phenomena caused by multiple electrical sinusoidal frequencies is given in U.S. Pat. No. 6,233,379 by Kim.

The core 70 of the optical fiber 32 is substantially circularly-symmetric to ensure the refractive index of the core mode is essentially insensitive to the state of optical polarization. In a typical non-birefringent single-mode fiber (as in 32 herein), the effective index difference between orthogonal polarization states is typically smaller than $10^{-5}$.

The chirped broadband cladding mode coupler 34 is composed of a first acoustic-wave generator 36, a first acoustic wave amplifier 38, and a first acousto-optic interaction region 43 of optical fiber 32. To couple lightwaves from a core mode to a cladding mode, the phase matching condition must be satisfied. The propagation constants of the optical modes can be changed by varying the diameter of the optical fiber 32. In the first acousto-optic interaction region 43 of optical fiber 32, the outer diameter of the cladding 72 as well as the outer diameter of the core 70 is altered. As illustrated in FIG. 1, the first acousto-optic interaction region 43 of the optical fiber 32 has an outer diameter that changes along its longitudinal length in a continuous, typically linear, fashion. Within this first acousto-optic interaction region 43, both the phase matching condition and the coupling strength are varied along its longitudinal axis, and the phase matching condition for different optical wavelengths are satisfied at different positions along the longitudinal axis. Coupling between the lower order core mode and a higher order cladding mode then can take place over a wide optical wavelength range. The size of the optical bandwidth can be controlled by the degree of change in the diameter of the optical fiber 32 within the first acousto-optic interaction region 43. In addition, the coupling efficiency over a broad optical bandwidth can be controlled by extending the length of the fiber 32 at certain fiber diameters. By extending the length of the fiber 32 at certain fiber diameters, the interaction length is increased allowing for stronger coupling to occur. It is preferable that most if not all of the optical lightwaves be removed from the core 70 of the optical fiber 32 to prevent optical interference from occurring when the cladding modes are coupled back into the core by the narrow-band core mode coupler 35.

The function of the chirped broadband cladding mode coupler 34 is to significantly couple the core-mode lightwaves of the optical fiber 32 entering the bandpass filter 30 into cladding mode lightwaves. Although the cladding 72 of the fiber 32 may support multiple modes, the lightwaves are coupled to a specific cladding mode, preferably of a lower order mode (i.e. LP(1,1), (1,2), or (1.3)).

The entire broadband signal, having been coupled into a cladding mode in the chirped broadband cladding mode coupler 34, now propagates parallel to the optical axis of the fiber 32 within the cladding 72 into a narrow-band core mode coupler 35 and second acousto-optic interaction region 44 where selected bands of optical wavelengths are coupled from the fiber 32 cladding 72 back to the core 70. A typical bandwidth for each of the selected bands of optical wavelengths being coupled back into the core 70 is 0.4 2.0 nm. This coupling is tuned by varying the electrical sinusoidal frequency of the second frequency source 54, which is electrically coupled to a second acoustic-wave generator 37, which in turn couples acoustic energy through the second acoustic wave amplifier 46 to the fiber 32. The second acousto-optic interaction region 44 extends from the acoustic absorber 48 to the tip of the second acoustic wave amplifier 41. The length of the fiber 32 in the second acousto-optic interaction region 44 is typically less than 1 meter, and preferably less than 20 cm. The uniformity of the fiber diameter and index of refraction within the second acousto-optic interaction region 44 maximizes coupling efficiency and minimizes spectral sidebands in the transmission spectrum of the filter. Other issues regarding the length of this second acousto-optic interaction region 44 are discussed in U.S. Pat. No. 6,233,379 by Kim, previously incorporated as a reference.

To limit the acousto-optic interaction between the chirped broadband cladding mode coupler 34 and the narrow-band core mode coupler 35, an acoustic absorber 48 is interposed surrounding the fiber 32 between the first acousto-optic interaction region 43 and the second acousto-optic interaction region 44. The acoustic absorber 48, which can be constructed from a variety of materials, is coupled to and surrounds the fiber 32 and has an index of refraction lower than the cladding 72 to prevent the cladding modes from being absorbed by the acoustic absorber 48. The lower index of refraction will permit the lightwaves to continue within the cladding 72 without being disturbed by the acoustic absorber 48. The acoustic absorber 48 significantly dampens any acoustic waves and minimizes reflections of the acoustic waves. Any reflections of acoustic waves would cause an intensity modulation of the optical signal passing through the bandpass filter 30 by generating frequency sidebands in the optical signal.

Figure 5:
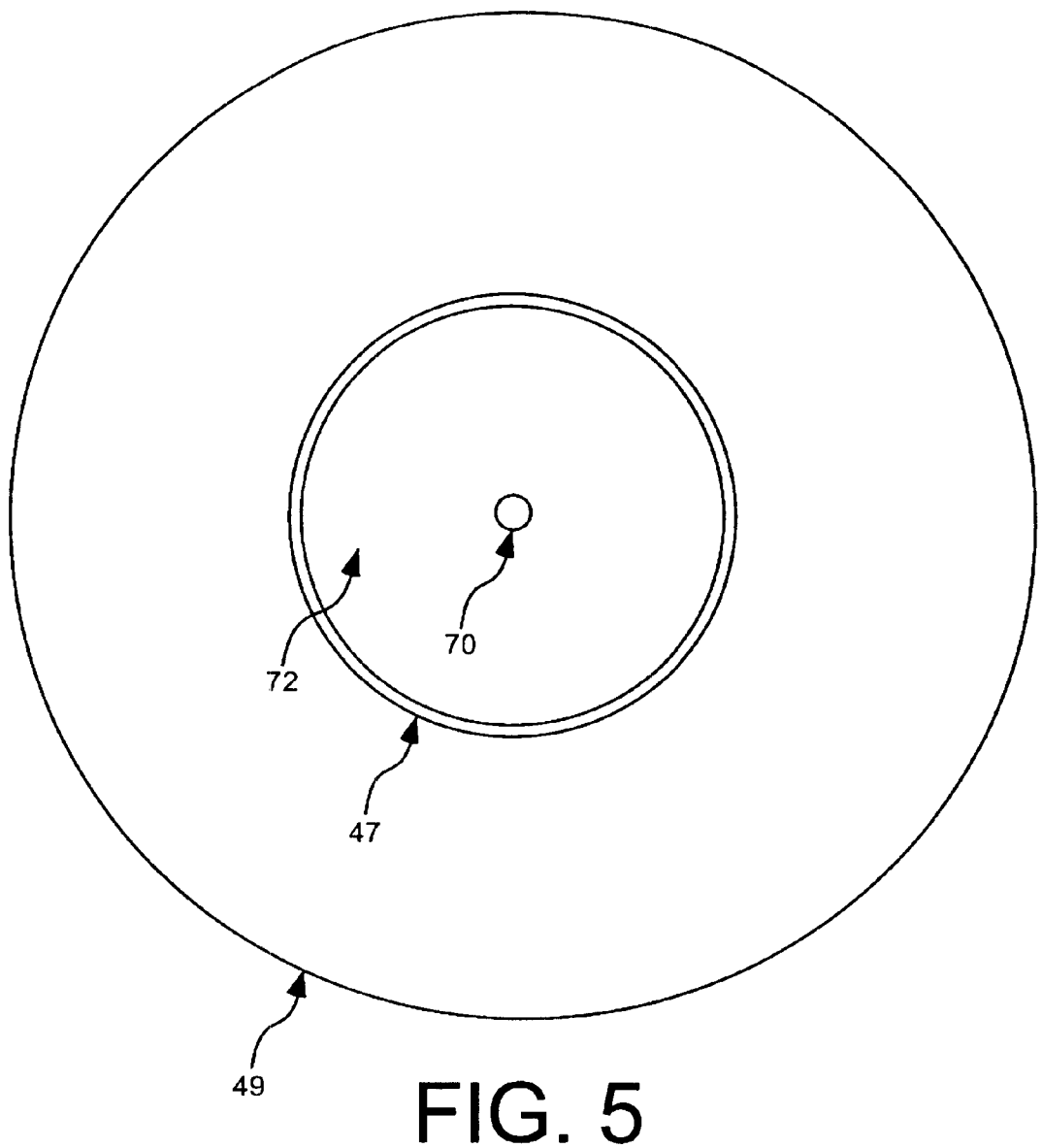
FIG. 5 is a cross-sectional view of a high index acoustic absorber configuration.

An alternative embodiment of an acoustic absorber 48 consists of a low refractive index thin layer 47 surrounding the fiber 32 with a high refractive index acoustic absorber 49 coupled to the low refractive index thin layer 47 as shown in FIG. 5.

Figure 6:
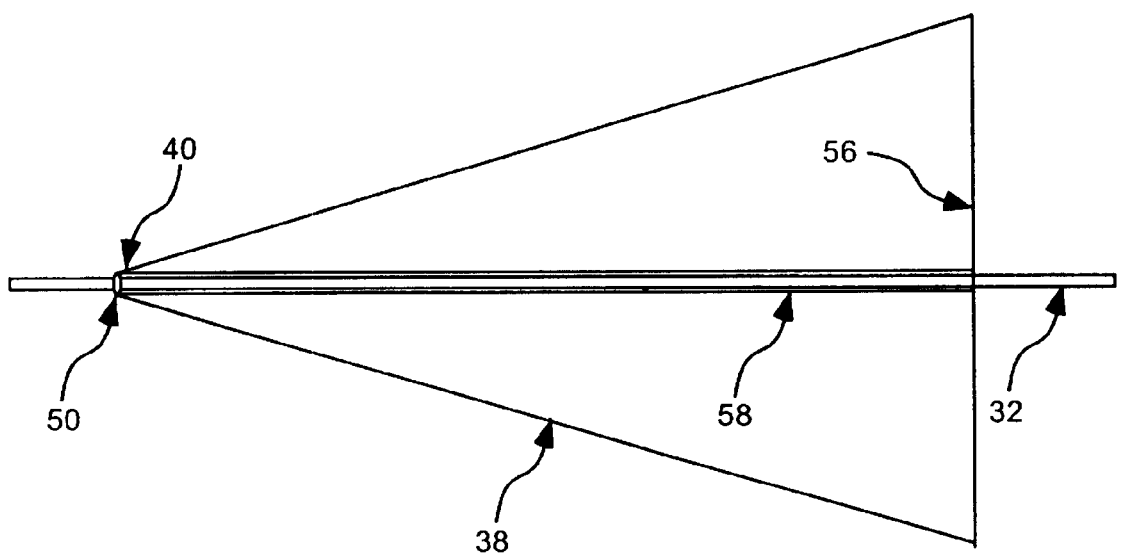
FIG. 6 is a detailed view of the acoustic wave amplifier.

Referring to FIG. 6, the first acoustic wave amplifier 38 shown is an exemplar for both the first 38 and second 46 acoustic wave amplifiers. The design options discussed for the first acoustic wave amplifier 38 apply to both the first 38 and second 46 acoustic wave amplifiers. The first acoustic wave amplifier 38 may have a variety of different geometric configurations but is preferably elongated along the fiber longitudinal axis. Typical longitudinal lengths of the first acoustic wave amplifier are 5 15 millimeters. In various embodiments, the first acoustic wave amplifier 38 is tapered linearly from the base 56 to the tip 40 and may be conical as illustrated in FIG. 6. The, typically conical, shape of the first acoustic wave amplifier 38 provides magnification of the acoustic wave amplitude at the tip 40. Generally, the first acoustic wave amplifier 38 has a longitudinal axis that is parallel to the fiber 32, however the first acoustic wave amplifier 38 may be coupled to the fiber 32 at any angle or even from the side such that the axis of the first acoustic wave amplifier 38 is nearly orthogonal to the axis of the fiber 32. The first acoustic wave amplifier 38 may be made from a glass capillary, such as fused silica, a cylindrical rod with a central hole, or the like. In another fashioning, a glass capillary is machined to form a cone and the flat bottom of the cone is bonded to an acoustic wave generator. To preserve the phase of the acoustic waves, the exterior surface of the first acoustic wave amplifier 38 is generally smooth. In other embodiments, the first acoustic wave amplifier 38 is horn shaped with a diameter that decreases exponentially from the base 56 to the tip 40.

In an embodiment of the bandpass filter 30, the first acoustic wave amplifier 38 has an interior containing a fiber receiving channel 58. The fiber receiving channel 58 can be a capillary channel with a diameter slightly greater than the outer diameter of the fiber 32 used.

In typical embodiments, a bonding agent 50 is positioned between the fiber 32 and the fiber receiving channel 58 at an interface in proximity to the tip of the first acoustic wave amplifier 40. Suitable bonding agents 50 include, but are not limited to, epoxy, glass solder, metal solder, and the like. The bonding agent 50 is sufficiently rigid for efficient coupling of the acoustic waves from the first acoustic wave amplifier 38 to the fiber 32 and the bonding agent 50 is sufficiently rigid to minimize back reflections of the acoustic waves from the fiber 32 to the first acoustic wave amplifier 38.

The dimensions of the fiber receiving channel 58 and the outer diameter of the fiber 32 are sufficiently matched to place the two in close proximity so as to minimize the amount of bonding agent 50 needed. The relative sizes of the fiber 32 and the fiber receiving channel 58 need only be substantially the same at the interface. The difference in the diameter of fiber 32 and fiber receiving channel 58 is in the range of 1–10 microns.

Although various preferred embodiments of the present invention have been described herein in detail to provide for complete and clear disclosure, it will be appreciated by those skilled in the art, that variations may be made thereto without departing from the spirit of the invention or the scope of the appended claims.

What is claimed is:

1. A chirped fiber acousto-optic bandpass filter, comprising:
    a non-birefringent single-mode optical fiber, with a longitudinal axis, core, concentric cladding over the core, and proximal and distal ends;
    a broadband cladding mode coupler further comprising a first longitudinal length of the optical fiber closer to the proximal end of the optical fiber, wherein said first longitudinal length has a chirped diameter, and at least one first acoustic-wave generator coupled to the optical fiber within the first longitudinal length;
    a narrow-band core mode coupler further comprising a second longitudinal length of the optical fiber closer to the distal end of the optical fiber and at least one second acoustic-wave generator coupled to the optical fiber within the second longitudinal length; and
    an acoustic absorber deployed and coupled to the optical fiber between said broadband cladding mode coupler and said narrow-band core mode coupler.

2. The filter of claim 1, wherein the diameter of said second longitudinal length of the optical fiber is tapered.

3. The filter of claim 1, wherein said first longitudinal length of the optical fiber, in addition to having a chirped diameter, also has a tapered diameter.

4. The filter of claim 1, wherein said optical fiber is tensioned along its longitudinal axis.

5. The filter of claim 1, wherein the chirped diameter of the optical fiber within the first longitudinal length is held constant at some intermediate chirped diameter for some length of the portion of the optical fiber having a chirped diameter.

6. The filter of claim 1, wherein said acoustic absorber is further comprised of a low refractive index thin layer of material surrounding the optical fiber and a high refractive index acoustic absorber coupled to the low refractive index thin layer of material.

7. The filter of claim 1, wherein at least one of said first acoustic-wave generators is coupled to the optical fiber with a bonding agent.

8. The filter of claim 1, wherein at least one of said second acoustic-wave generators is coupled to the optical fiber with a bonding agent.

9. The filter of claim 1, wherein at least one of said first acoustic-wave generators has an exterior diameter that is elongated along the optical fiber longitudinal axis.

10. The filter of claim 1, wherein at least one of said second acoustic-wave generators has an exterior diameter that is elongated along the optical fiber longitudinal axis.

11. The filter of claim 1, wherein at least one of said first acoustic-wave generators is electrically connected to at least one frequency source.

12. The filter of claim 1, wherein at least one of said second acoustic-wave generators is electrically connected to at least one frequency source.

13. The device of claim 1, wherein the diameter of said second longitudinal length of the optical fiber is uniformly tapered.

14. The filter of claim 1, wherein said first longitudinal length of the optical fiber, in addition to having a chirped diameter, also has a uniformly tapered diameter.

* * * * *